US012579884B2

(12) United States Patent
Honda

(10) Patent No.: US 12,579,884 B2
(45) Date of Patent: Mar. 17, 2026

(54) TRAFFIC LIGHT CONTROL DEVICE, TRAFFIC LIGHT CONTROL METHOD, AND TRAFFIC LIGHT CONTROL SYSTEM

(71) Applicant: TOYOTA JIDOSHA KABUSHIKI KAISHA, Toyota (JP)

(72) Inventor: Hiroyasu Honda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/763,612

(22) Filed: Jul. 3, 2024

(65) Prior Publication Data

US 2025/0014457 A1 Jan. 9, 2025

(30) Foreign Application Priority Data

Jul. 4, 2023 (JP) ................................. 2023-110300

(51) Int. Cl.
*G08G 1/005* (2006.01)
*G06V 20/54* (2022.01)
*G08G 1/04* (2006.01)
*G08G 1/07* (2006.01)

(52) U.S. Cl.
CPC .............. *G08G 1/005* (2013.01); *G08G 1/04* (2013.01); *G08G 1/07* (2013.01); *G06V 20/54* (2022.01)

(58) Field of Classification Search
None
See application file for complete search history.

(56) References Cited

U.S. PATENT DOCUMENTS

2024/0233526 A1* 7/2024 Pasch ................... G08G 1/0116

FOREIGN PATENT DOCUMENTS

JP 2017-208141 A 11/2017

OTHER PUBLICATIONS

"Document 2-5: Efforts Towards Practical Implementation of Safety Driving Support Systems through Infrastructure Cooperation;" National Police Agency, Traffic Bureau; Dec. 5, 2008, pp. 1-10.

* cited by examiner

*Primary Examiner* — John F Mortell
(74) *Attorney, Agent, or Firm* — Oliff PLC

(57) ABSTRACT

A traffic light control device includes one or more memories, and one or more processors in communication with the one or more memories. The one or more processors configured to perform processes including acquiring detection results of a moving object in a plurality of detection target areas around a crosswalk including the crosswalk, perceiving a combination of presence or absence of the moving object in each of the areas based on the acquired detection results, and controlling a pedestrian traffic light and a vehicle traffic light based on the combination.

20 Claims, 7 Drawing Sheets

FIG. 6

| OR | AND | |
|---|---|---|
| | | (1) MOVING OBJECT(S) HAS BEEN "PRESENT" IN THIRD AREA(S) FOR ONE OR MORE SECONDS |
| | OR | (2) THERE IS "NO" MOVING OBJECT IN FIRST AREA AND SECOND AREAS |
| | | (3) THERE HAS BEEN "NO" MOVING OBJECT IN FIRST AREA FOR THREE OR MORE SECONDS AND THERE IS "NO" MOVING OBJECT IN FOURTH AREAS |
| | | (4) THERE HAS BEEN "NO" MOVING OBJECT IN FIRST AREA FOR FIVE OR MORE SECONDS AND MOVING OBJECT(S) HAS BEEN "PRESENT" IN FOURTH AREA(S) FOR 10 OR MORE SECONDS |
| | | (5) THERE HAS BEEN "NO" MOVING OBJECT IN FIRST AREA FOR FIVE OR MORE SECONDS AND MOVING OBJECT(S) HAS BEEN "PRESENT" IN FIFTH AREA(S) FOR 30 OR MORE SECONDS |
| | | (6) MOVING OBJECT(S) IS "PRESENT" IN THIRD AREA(S) AND FIRST STATE HAS CONTINUED FOR THREE OR MORE MINUTES |

FIG. 7

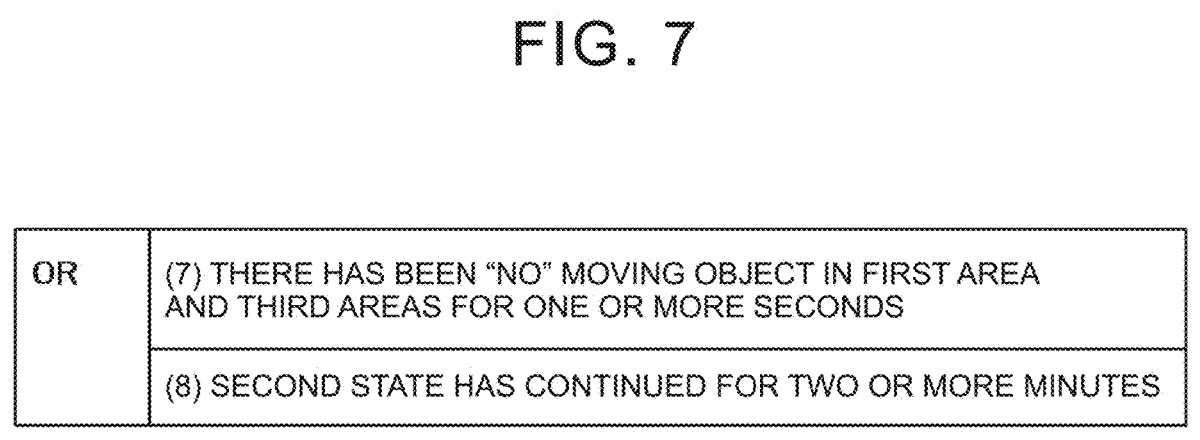

| OR | (7) THERE HAS BEEN "NO" MOVING OBJECT IN FIRST AREA AND THIRD AREAS FOR ONE OR MORE SECONDS |
| | (8) SECOND STATE HAS CONTINUED FOR TWO OR MORE MINUTES |

TRAFFIC LIGHT CONTROL DEVICE, TRAFFIC LIGHT CONTROL METHOD, AND TRAFFIC LIGHT CONTROL SYSTEM

CROSS-REFERENCE TO RELATED APPLICATION

This application claims priority to Japanese Patent Application No. 2023-110300 filed on Jul. 4, 2023, incorporated herein by reference in its entirety.

BACKGROUND

1. Technical Field

The present disclosure relates to traffic light control devices, traffic light control methods, and traffic light control systems.

2. Description of Related Art

Conventionally, a crosswalk signal system has been proposed that detects a pedestrian waiting to use a crosswalk and controls pedestrian traffic lights and vehicle traffic lights by recall control based on the detection of the waiting pedestrian (see, for example, Japanese Unexamined Patent Application Publication No. 2017-208141 (JP 2017-208141 A)). According to JP 2017-208141 A, an imaging device captures an image including a pedestrian standing in front of a crosswalk, and predetermined image analysis is performed on the captured image to determine whether the pedestrian is a waiting pedestrian wanting to use the crosswalk. This image analysis includes processing such as extracting a person from an image portion corresponding to a waiting area in the captured image, tracking the extracted person, and determining the gaze direction of the extracted person.

SUMMARY

Since the conventional method for controlling traffic lights at a crosswalk predicts pedestrian crossing intention using complex image processing, determination may fluctuate. It may also be difficult to determine the pedestrian's gaze direction etc., depending on conditions such as weather and brightness. That is, since the related art requires sophisticated image perception, the robustness of the image perception may not be high enough, which may affect stable operation.

It is an object of the present disclosure to improve techniques for controlling traffic lights at a crosswalk.

A traffic light control device according to a first aspect of the present disclosure includes one or more memories, and one or more processors in communication with the one or more memories. The one or more processors configured to perform processes including acquiring detection results of a moving object in a plurality of detection target areas around a crosswalk including the crosswalk, perceiving a combination of presence or absence of the moving object in each of the areas based on the acquired detection results, and controlling a pedestrian traffic light and a vehicle traffic light based on the combination.

In the above traffic light control device, the processes may further include controlling the pedestrian traffic light to give an indication that pedestrians are allowed to proceed, when there is no moving object in any of the areas.

In the above traffic light control device, the areas may include a first area, a second area, and a third area, the first area being an area on the crosswalk, the second area being an area that is used by a pedestrian located near the crosswalk, and the third area being an area that is used by a vehicle proceeding toward the crosswalk.

In the above traffic light control device, the processes may further include the pedestrian traffic light and the vehicle traffic light to transition between a first state and a second state based on the combination of the presence or absence of the moving object in the first area, the second area, and the third area, the first state being a state in which the pedestrian traffic light allows pedestrians to proceed and the vehicle traffic light prohibits vehicles from proceeding, and the second state being a state in which the pedestrian traffic light prohibits pedestrians from proceeding and the vehicle traffic light allows vehicles to proceed.

In the above traffic light control device, the processes may further include controlling the pedestrian traffic light and the vehicle traffic light to transition to the second state when the pedestrian traffic light and the vehicle traffic light are in the first state, there is no moving object in the first area and the second area, and there is a moving object in the third area.

In the above traffic light control device, the processes may further include controlling the pedestrian traffic light and the vehicle traffic light to transition to the second state a first period of time after there is no moving object in the first area any more, when the pedestrian traffic light and the vehicle traffic light are in the first state, there is no moving object in the second area, and there is a moving object in the third area.

In the above traffic light control device, the processes may further include controlling the pedestrian traffic light and the vehicle traffic light to transition to the second state when there has been no moving object in the first area for a second period of time or more and there has been any moving object in the second area for a third period of time or more, when the pedestrian traffic light and the vehicle traffic light are in the first state and there is a moving object in the third area.

In the above traffic light control device, the second area may include a fourth area and a fifth area, the fourth area being an area adjacent to the crosswalk, and the fifth area being an area located farther away from the crosswalk than the fourth area is. In the above traffic light control device, the third period of time varies between when there is a moving object in the fourth area and when there is a moving object in the fifth area and there is no moving object in the fourth area.

In the above traffic light control device, the processes may further include controlling the pedestrian traffic light and the vehicle traffic light to transition to the second state when the pedestrian traffic light and the vehicle traffic light are in the first state and there has been any moving object in the third area for a fourth period of time.

In the above traffic light control device, the processes may further include controlling the pedestrian traffic light and the vehicle traffic light to transition to the first state when the pedestrian traffic light and the vehicle traffic light are in the second state and there has been no moving object in the first area and the third area for a fifth period of time.

In the above traffic light control device, the processes may further include controlling the pedestrian traffic light and the vehicle traffic light to transition to the first state when the pedestrian traffic light and the vehicle traffic light are in the second state and the second state has continued for a sixth period of time.

In the above traffic light control device, the moving object may include a plurality of different types of moving objects including a pedestrian, a bicycle, and a vehicle. In the above traffic light control device, the processes may include not distinguishing among the types of moving objects.

In the above traffic light control device, the processes may further include acquiring the detection results from a camera having a function to identify a moving object from a captured image.

A traffic light control method according to a second aspect of the present disclosure is a traffic light control method that is performed by a control unit of a traffic light control device. The traffic light control method includes, acquiring detection results of a moving object in a plurality of detection target areas around a crosswalk including the crosswalk; perceiving a combination of presence or absence of the moving object in each of the areas based on the detection results; and controlling a pedestrian traffic light and a vehicle traffic light based on the combination.

In the above traffic light control method, the traffic light control method may further include controlling the pedestrian traffic light to give an indication that pedestrians are allowed to proceed, when there is no moving object in any of the areas.

In the above traffic light control method, the areas include a first area, a second area, and a third area, the first area being an area on the crosswalk, the second area being an area in a path for pedestrians and located adjacent to the crosswalk, and the third area being an area that is used by a vehicle proceeding toward the crosswalk. The traffic light control method may further include controlling the pedestrian traffic light and the vehicle traffic light to transition between a first state and a second state based on the combination of the presence or absence of the moving object in the first area, the second area, and the third area, the first state being a state in which the pedestrian traffic light allows pedestrians to proceed and the vehicle traffic light prohibits vehicles from proceeding, and the second state being a state in which the pedestrian traffic light prohibits pedestrians from proceeding and the vehicle traffic light allows vehicles to proceed.

In the above traffic light control method, the traffic light control method may further include controlling the pedestrian traffic light and the vehicle traffic light to transition to the second state when the pedestrian traffic light and the vehicle traffic light are in the first state, there is no moving object in the first area and the second area, and there is a moving object in the third area.

In the above traffic light control method, the traffic light control method may further include controlling the pedestrian traffic light and the vehicle traffic light to transition to the second state a first period of time after there is no moving object in the first area any more when the pedestrian traffic light and the vehicle traffic light are in the first state, there is no moving object in the second area, and there is a moving object in the third area.

In the above traffic light control method, the traffic light control method may further include controlling the pedestrian traffic light and the vehicle traffic light to transition to the second state when there has been no moving object in the first area for a second period of time or more and there has been any moving object in the second area for a third period of time or more, when the pedestrian traffic light and the vehicle traffic light are in the first state and there is a moving object in the third area.

In the above traffic light control method, the second area may include a fourth area and a fifth area, the fourth area being an area adjacent to the crosswalk, and the fifth area being an area located farther away from the crosswalk than the fourth area is, and the third period of time may vary between when there is a moving object in the fourth area and when there is a moving object in the fifth area and there is no moving object in the fourth area.

A traffic light control system according to a third aspect of the present disclosure includes, a pedestrian traffic light and a vehicle traffic light that are installed to control traffic at a crosswalk, a detector configured to detect a moving object in a plurality of detection target areas around the crosswalk including the crosswalk, and a traffic light control device including one or more processors, the one or more processors being configured to perform acquiring detection results of a moving object from the detector, and perceiving a combination of presence or absence of the moving object in each of the areas based on the detection results, and controlling the pedestrian traffic light and the vehicle traffic light based on the combination.

According to the present disclosure, it is possible to improve techniques for controlling traffic lights at a crosswalk.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 shows an example of transition conditions from a first state to a second state; and FIG. 7 shows an example of transition conditions from the second state to the first state.

DETAILED DESCRIPTION OF EMBODIMENTS

Figure 1:
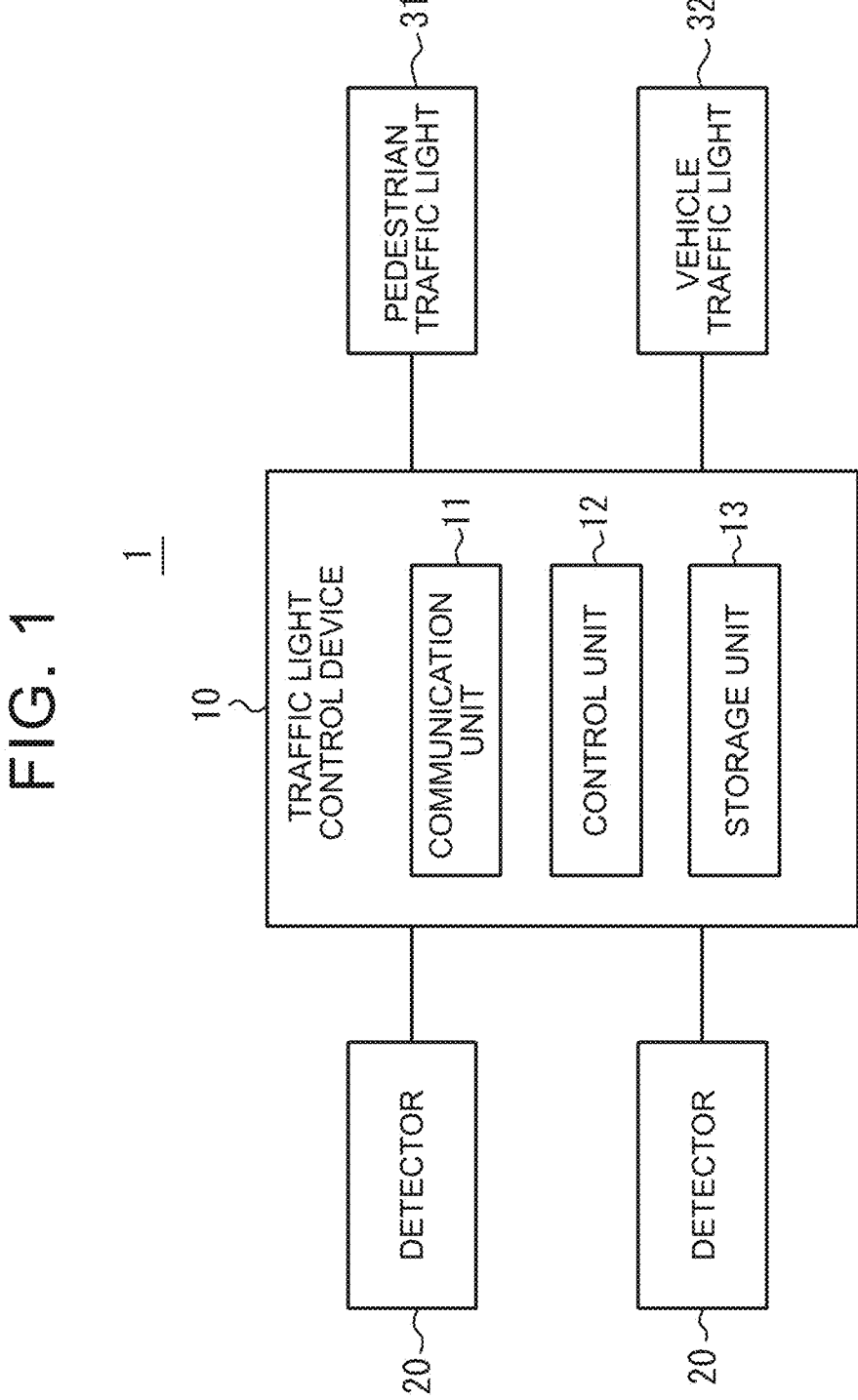
FIG. 1 is a block diagram showing a schematic configuration of a traffic light control system according to an embodiment of the present disclosure.

Hereinafter, an embodiment of the present disclosure will be described below with reference to the drawings. The drawings used in the following description are schematic diagrams. The dimensions, proportions, etc. in the drawings do not necessarily reflect actual ones.

Configuration of Traffic Light Control System

As shown in FIG. 1, a traffic light control system 1 according to an embodiment of the present disclosure includes a traffic light control device 10, one or more detectors 20, pedestrian traffic lights 31, and vehicle traffic lights 32. The traffic light control device 10 is connected to the detector 20, the pedestrian traffic lights 31, and the vehicle traffic lights 32 by a wired communication unit and/or a wireless communication unit so that the traffic light control device 10 can communicate with them.

The traffic light control device 10 is a computer that controls the pedestrian traffic lights 31 and the vehicle traffic lights 32. The traffic light control device 10 may be installed adjacent to the pedestrian traffic light 31 and the vehicle traffic light 32. At least part of functions of the traffic light control device 10 may be located at a remote location away from the pedestrian traffic lights 31 and the vehicle traffic lights 32. The traffic light control device 10 includes a communication unit 11, a control unit 12, and a storage unit 13.

The communication unit 11 includes a communication interface for communicating with external devices outside the traffic light control device 10. The external devices include the detector 20, the pedestrian traffic lights 31, and the vehicle traffic lights 32. The communication unit 11 supports wired communication and/or wireless communication.

The control unit 12 includes one or more processors and one or more memories. The processor includes a general-purpose processor that executes a programmed function by loading a specific program, and a dedicated processor that is dedicated to specific processing. The control unit 12 controls the pedestrian traffic lights 31 and the vehicle traffic lights 32 by loading a program for traffic light control. The control unit 12 performs various calculations for controlling the pedestrian traffic lights 31 and the vehicle traffic lights 32.

The storage unit 13 includes at least one semiconductor memory, at least one magnetic memory, at least one optical memory, or a combination of at least two of these. The storage unit 13 functions as, for example, a main storage device, an auxiliary storage device, or a cache memory. The storage unit 13 stores programs and data to be used for the operation of the traffic light control device 10 and data obtained by the operation of the traffic light control device 10. The information stored in the storage unit 13 may be updatable with, for example, information acquired from the communication unit 11.

The traffic light control device 10 may include an input unit and a display unit in addition to the communication unit 11, the control unit 12, and the storage unit 13. The input unit includes a button switch and a touch panel that are directly operated by an administrator of the traffic light control system 1. The display unit includes a display such as a liquid crystal display (LCD) for giving an indication according to the administrator's operations.

The detector 20 is a sensor that detects a moving object in a surrounding area of a crosswalk 41 (see FIG. 2) including the crosswalk 41. In the present disclosure, the term "moving object" means a movable person or object. The moving object may be at a complete stop at a certain moment. The moving object may include a plurality of types of people or objects such as a pedestrian 42, a vehicle 43, a bicycle, and a personal mobility vehicle (PMV). The term "moving object" is interchangeable with "traffic participant." The detector 20 does not need to identify the type of moving object. Two or more detectors 20 may be installed to detect a moving object in a predetermined surrounding area. The detector 20 is configured to send its detection results to the traffic light control device 10. The detection results of the detector 20 are used to perceive the presence or absence of a moving object in each of a plurality of areas included in the surrounding area of the crosswalk 41 including the crosswalk 41.

The detector 20 is, for example, a camera that is fixed to a structure adjacent to the crosswalk 41, such as a traffic light or a utility pole, and that captures an image of the surrounding area of the crosswalk 41. The camera is not limited to a camera that captures an image of visible light, but may include an infrared camera that captures an image of infrared light. In the case where the detector 20 is a camera, the phase "detect a moving object" as used in the present disclosure means both simply capturing an image including the moving object and identifying the moving object from the captured image.

The detector 20 can be, for example, an edge artificial intelligence (AI) camera. An edge AI camera is a camera with an AI processing function. The edge AI camera can perform AI processing on a captured image inside the camera and send the processing results to the traffic light control device 10. The edge AI camera can identify a moving object from a captured image and send information on the identified moving object together with the captured image to the traffic light control device 10.

The detector 20 may be a common camera rather than an edge AI camera. In this case, the detector 20 may send a captured image to the traffic light control device 10 as detection results. The control unit 12 detects a moving object in each area from the captured image. In this case, the control unit 12 may have a function to perform AI image analysis processing.

The detector 20 is not limited to a camera. The detector 20 may be any sensor that can be used to detect the presence or absence of a moving object in a specific area. The detector 20 may include, for example, an ultrasonic sensor and/or an infrared sensor that is fixed to a structure on a pedestrian road 44 and/or a vehicle road 45. Alternatively, the detector 20 may be a sensor embedded in the vehicle road 45, such as a loop coil detector. These sensors may be installed at the ends of a specific area, and the detector 20 may detect the presence or absence of a moving object entering or exiting the specific area.

The pedestrian traffic lights 31 and the vehicle traffic lights 32 are installed to control traffic at the crosswalk 41.

The pedestrian traffic lights 31 are traffic lights installed on both sides of the vehicle road 45 with the crosswalk 41 therebetween. Each pedestrian traffic light 31 is installed with its light-emitting portion oriented in such a direction that the light-emitting portion faces pedestrians 42 who cross the crosswalk 41. The pedestrian traffic light 31 gives pedestrians 42 an indication that pedestrians 42 are allowed to cross the crosswalk 41 and an indication that pedestrians 42 are not allowed to cross the crosswalk 41. For example, the pedestrian traffic light 31 includes a green light-emitting portion and a red light-emitting portion. When the green light-emitting portion is on, it indicates that pedestrians 42 are allowed to cross the crosswalk 41. When the red light-emitting portion is on, it indicates that pedestrians 42 are not allowed to cross the crosswalk 41. Before the pedestrian traffic light 31 switches from the state in which the green light-emitting portion is on to the state in which the red light-emitting portion is on, the green light-emitting portion flashes to notify that the signal is about to change. The pedestrian traffic lights 31 are controlled by the traffic light control device 10.

The vehicle traffic lights 32 are traffic lights installed on both sides of the crosswalk 41 so as to face drivers of vehicles 43 on the vehicle road 45. The vehicle traffic light 32 gives drivers of vehicles 43 an indication that vehicles 43 are allowed to proceed across the crosswalk 41 and an indication that vehicles 43 are not allowed to proceed across the crosswalk 41. For example, the vehicle traffic light 32 includes green, red, and yellow light-emitting portions. The green light-emitting portion indicates that vehicles 43 are allowed to proceed across the crosswalk 41. The red light-emitting portion indicates that vehicles 43 are not allowed to proceed across the crosswalk 41. The green light turns yellow and then red. The vehicle traffic lights 32 are controlled by the traffic light control device 10.

The pedestrian traffic lights 31 and the vehicle traffic lights 32 are not limited to those that indicate that traffic is or is not allowed to proceed by the colors of the light-emitting portions as described above. For example, the pedestrian traffic lights 31 and/or the vehicle traffic lights 32 may have an arrow indication to indicate that traffic is allowed to proceed. The color of the light-emitting portion that indicates that traffic is allowed to proceed may be blue instead of green. Hereinafter, for simplicity of description, the states indicated by the traffic lights are sometimes described using the colors such as green, red, and yellow indicated by the traffic lights.

Example of Arrangement of Areas and Devices Around Crosswalk

Figure 2:
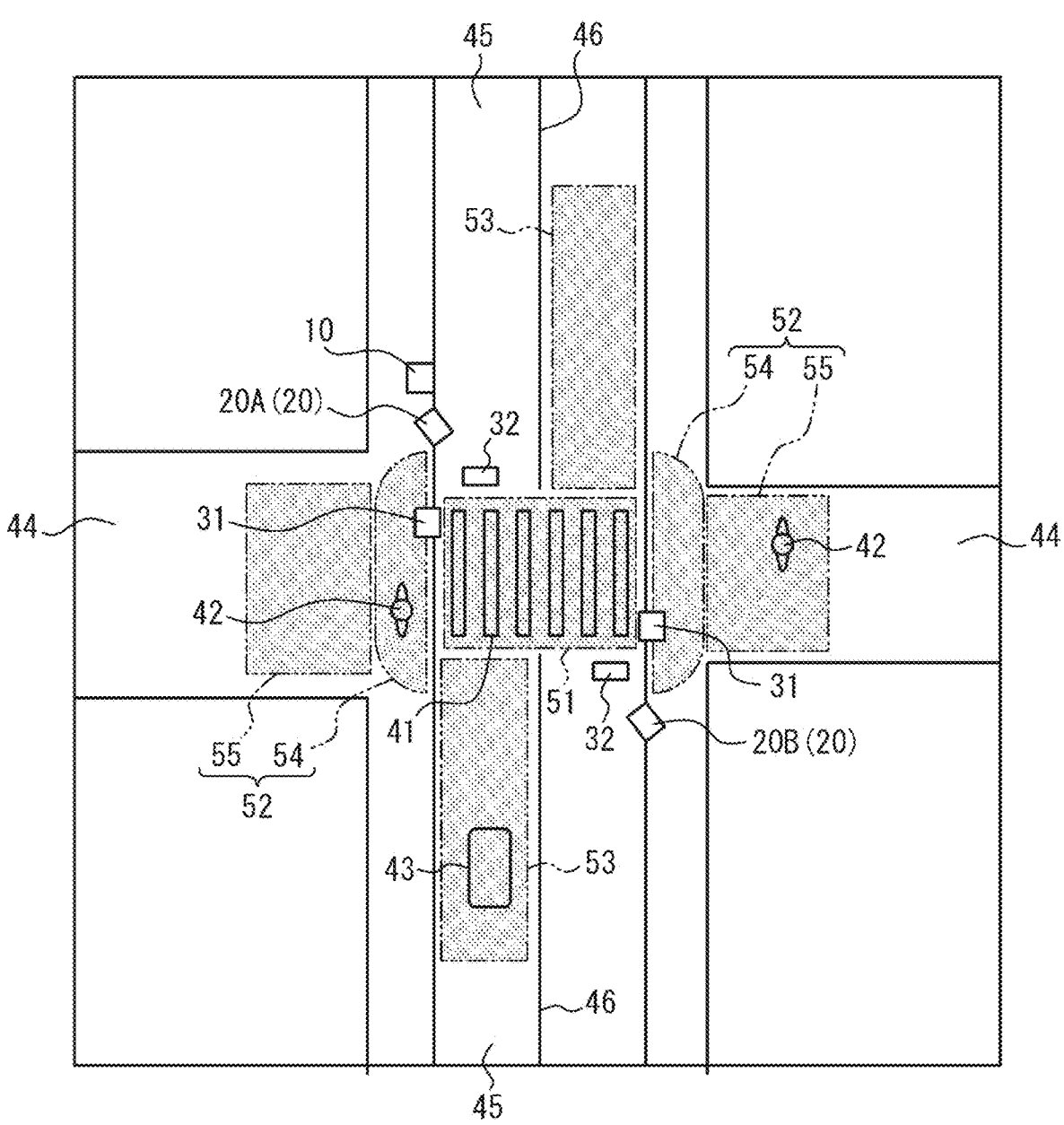
FIG. 2 is a plan view illustrating an example of the arrangement of components of the traffic light control system in FIG. 1 and detection target areas.

FIG. 2 shows an example of the arrangement of the crosswalk 41, a plurality of detection target areas, and components of the traffic light control system 1 at a position where the pedestrian road 44 and the vehicle road 45 intersect each other.

The pedestrian road 44 is a road used not only by pedestrians 42 but also by bicycles and PMVs. Pedestrians 42, bicycles, and PMVs are included in moving objects. A moving object that moves on the pedestrian road 44 crosses the crosswalk 41 according to the pedestrian traffic light 31. Since the traffic light control system 1 does not identify the type of moving object, any moving object moving on the pedestrian road 44 is substantially regarded as a pedestrian 42.

The vehicle road 45 is a road used not only by vehicles 43 but also by bicycles and PMVs. The vehicles 43, bicycles, and PMVs are included in moving objects. A moving object that moves on the vehicle road 45 proceeds along the vehicle road 45 according to the vehicle traffic light 32. Since the traffic light control system 1 does not identify the type of moving object, any moving object moving on the vehicle road 45 is substantially regarded as a vehicle 43.

The crosswalk 41 and its surrounding detection target area include, for example, a first area 51, second areas 52, and third areas 53. The first area 51 is an area on the crosswalk 41. The second area 52 is an area used by pedestrians 42 near the crosswalk 41. The third area 53 is an area used by vehicles 43 proceeding toward the crosswalk 41. The third area 53 may be an area from a predetermined distance before the crosswalk 41 to immediately before the crosswalk 41 on a lane leading to the crosswalk 41 on the vehicle road 45. The predetermined distance can be set as desired according to the road environment, such as 30 m, 50 m, or 100 m. Hereinafter, the first area 51, the second area 52, and the third area 53 will also be referred to as crossing area, pedestrian-side vicinity area, and vehicle approach area, respectively. The second areas 52 are located one on each side of the vehicle road 45. The third areas 53 are located one in each side of the vehicle road 45 with a centerline 46 therebetween.

The second area 52 may include a fourth area 54 and a fifth area 55. The fourth area 54 is an area adjacent to the crosswalk 41 where pedestrians 42 wait for the signal to change. The fifth area 55 is an area located adjacent to the fourth area 54 and farther away from the crosswalk 41 than the fourth area 54 is and used by pedestrians 42 proceeding toward the crosswalk 41. The depths of the fourth and fifth areas 54, 55 can be set as desired according to the road environment etc. For example, the fourth area 54 may be an area on the pedestrian road 44 that has a width that is 1 m to 2 m greater than the width of the crosswalk 41 and a depth of 2 m, 3 m, or 5 m. For example, the fifth area 55 may be an area on the pedestrian road 44 that has a depth of 10 m, 20 m, or 30 m. As used herein, the term "depth" means the length in the direction in which the pedestrian road 44 extends. Hereinafter, the fourth area 54 and the fifth area 55 will also be referred to as pedestrian crossing waiting area and crossing pedestrian approach area, respectively.

In the example of FIG. 2, two detectors 20A, 20B are installed on both sides of the road with the crosswalk 41 therebetween as the detectors 20. In one embodiment, each of the detectors 20A, 20B may include one or more edge AI cameras. For example, the detector 20A may be configured to capture an image of the first area 51 and the second and third areas 52, 53 located on the detector 20A side (left side in FIG. 2) of the centerline 46 of the vehicle road 45. The detector 20B may be configured to capture an image of the first area 51 and the second and third areas 52, 53 located on the detector 20B side (right side in FIG. 2) of the centerline 46 of the vehicle road 45.

The detectors 20A, 20B that are edge AI cameras detect whether there is a moving object in their detection target areas. The detectors 20A, 20B need only detect the presence or absence of a moving object and the position (area) where the moving object is located, and do not need to analyze the type, orientation, direction of travel, speed, etc. of the moving object. Therefore, the detectors 20A, 20B do not need to perform complex image processing. The number of detectors 20 is not limited to two. The detector 20 may include a sufficient number of edge AI cameras to include the first to fifth areas 51 to 55 around the crosswalk 41 as areas whose image is to be captured. The edge AI cameras may be connected to each other so as to communicate with each other, and may be configured to integrate detected information on moving objects in the entire area around the crosswalk 41. The information detected by the detector 20A, namely the information on the presence or absence of a moving object in the first to fifth areas 51 to 55 and the position where the moving object is located, is sent to the traffic light control device 10.

The control unit 12 of the traffic light control device 10 integrates the information on the detection results acquired from the detectors 20A, 20B via the communication unit 11, and overall determines the presence or absence of a moving object in each of the first to fifth areas 51 to 55. This determination of the presence or absence of a moving object is made by integrating the detection results of all the detectors 20. In order to reduce or prevent fluctuations in determination due to fluctuations in detection, the control unit 12 determines that there is a moving object in an area when the moving object has been detected in the area for a certain period of time (e.g., 0.3 seconds) or more. The same applies when changing the determination of the presence or absence of a moving object from the determination that there is a moving object to the determination that there is no moving object.

The control unit 12 perceives a combination of the presence or absence of a moving object, namely a traffic participant such as a pedestrian 42 or a vehicle 43, in each of the first to fifth areas 51 to 55. Based on this combination, the control unit 12 determines the situation of a traffic participant such as a pedestrian 42 or a vehicle 43 in the crosswalk 41 and its surrounding area. The control unit 12 determines, for example, whether there is a pedestrian 42 crossing the crosswalk 41, whether there is a pedestrian 42 waiting at the crosswalk 41 to cross, and whether there is a vehicle 43 located in front of the crosswalk 41 and approaching the crosswalk 41 or a vehicle 43 waiting at the traffic light. The control unit 12 controls the pedestrian traffic lights 31 and the vehicle traffic lights 32 based on the combination of the presence or absence of a moving object in each of the first to fifth areas 51 to 55.

In the traffic light control system 1 of the present disclosure, the pedestrian traffic lights 31 and the vehicle traffic lights 32 are not controlled by calculating the time required for a moving object to reach the crosswalk 41. In the traffic light control system 1 of the present disclosure, the approach of a moving object to the crosswalk 41, the waiting state of a moving object, etc. are determined based on a combination of the arrangement and shapes of the detection target areas and the presence or absence of a moving object in each detection target area.

In one embodiment, the control unit 12 may control the pedestrian traffic lights 31 to give an indication that pedestrians 42 are allowed to proceed, when there is no moving object in any of the first to third areas 51 to 53. That is, the pedestrian traffic lights 31 may be green in a basic state, and the control unit 12 may control the pedestrian traffic lights 31 and the vehicle traffic lights 32 to turn the pedestrian traffic lights 31 red and the vehicle traffic lights 32 green only when a predetermined transition condition is satisfied. This can reduce the time a pedestrian 42 who has reached the crosswalk 41 waits for the pedestrian traffic light 31 to turn from red to green. Since the pedestrian traffic lights 31 are green in the basic state, it eliminates the need to analyze from an image of a pedestrian 42 approaching the crosswalk 41 whether the pedestrian 42 intends to cross the crosswalk 41, when there is no moving object at least in the third area 53.

Signal Timing Chart

Figure 3:
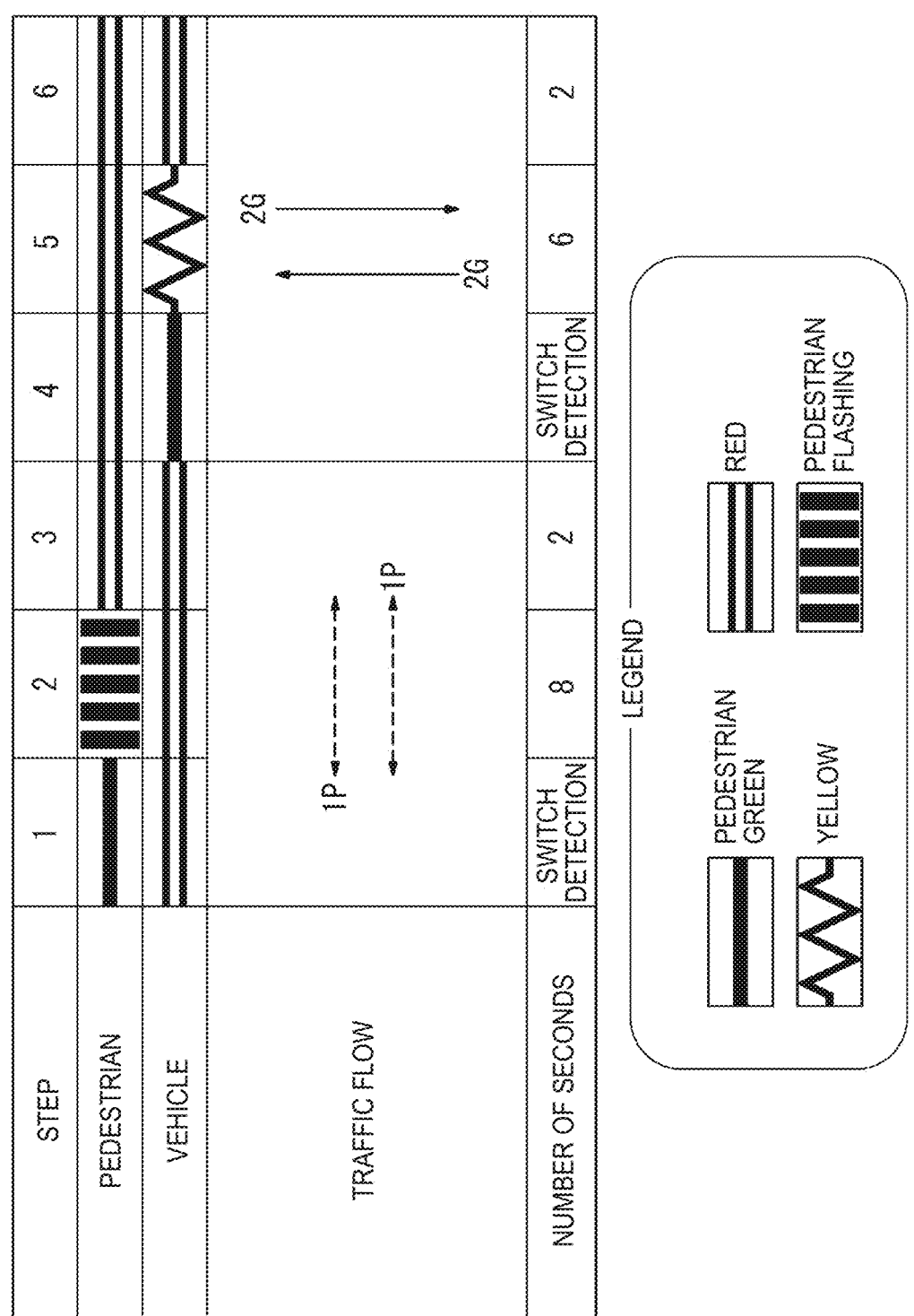
FIG. 3 shows an example of a signal timing chart of pedestrian traffic lights and vehicle traffic lights in FIG. 1.

The control unit 12 controls signal switching of the pedestrian traffic lights 31 and the vehicle traffic lights 32 according to, for example, a signal timing chart in FIG. 3.

Step 1 is a step in which the pedestrian traffic lights 31 are green and the vehicle traffic lights 32 are red. The state of step 1 is a first state. Step 1 can be the basic state of the pedestrian traffic lights 31 and the vehicle traffic lights 32 in the traffic light control system 1. Broken arrows shown in the traffic flow in the column of steps 1 to 3 indicate the directions of movement of pedestrians 42 represented by "1P." When determination conditions illustrated in FIG. 6, which will be described later, are satisfied in step 1, the control unit 12 instructs transition to step 2.

Step 2 is a step in which the pedestrian traffic lights 31 are flashing green and the vehicle traffic lights 32 are red. The control unit 12 continues step 2 for a predetermined number of seconds, and then controls the pedestrian traffic lights 31 and the vehicle traffic lights 32 to transition to step 3. In the example of FIG. 3, the number of seconds for step 2 is eight seconds.

Step 3 is a step in which the pedestrian traffic lights 31 and the vehicle traffic lights 32 are red. After a predetermined number of seconds have elapsed in step 3, the control unit 12 controls the pedestrian traffic lights 31 and the vehicle traffic lights 32 to transition to step 4. In the example of FIG. 3, the predetermined number of seconds is two seconds.

Step 4 is a step in which the pedestrian traffic lights 31 are red and the vehicle traffic lights 32 are green. The state of step 4 is a second state. In step 4, pedestrians 42 are not allowed to cross the crosswalk 41. In step 4, vehicles 43 are allowed to proceed across the crosswalk 41 on the vehicle road 45. Solid arrows shown in the traffic flow in the column of steps 4 to 6 indicate the directions of movement of vehicles 43 represented by "2G." When a determination condition illustrated in FIG. 7, which will be described later, is satisfied in step 4, the control unit 12 instructs transition to step 5.

Step 5 is a step in which the pedestrian traffic lights 31 are red and the vehicle traffic lights 32 are yellow. The control unit 12 continues step 5 for a predetermined number of seconds, and then controls the pedestrian traffic lights 31 and the vehicle traffic lights 32 to transition to step 6. In the example of FIG. 3, the number of seconds for step 6 is six seconds.

Step 6 is a step in which the pedestrian traffic lights 31 and the vehicle traffic lights 32 are red. After a predetermined number of seconds have elapsed in step 6, the control unit 12 controls the pedestrian traffic lights 31 and the vehicle traffic lights 32 to transition to step 1. In the example of FIG. 3, the predetermined number of seconds is two seconds.

The numbers of seconds shown in FIG. 3 are by way of example only. The numbers of seconds may be set to appropriate values according to the traffic environment, traffic volume, etc.

As shown in FIG. 3, in the traffic light control system 1, transition to the subsequent step is started when a predetermined determination condition(s) is satisfied in step 1 that is the first state and step S4 that is the second state. The first state is a state in which the pedestrian traffic lights 31 allow pedestrians 42 to proceed and the vehicle traffic lights 32 prohibits vehicles 43 from proceeding. The second state is a state in which the pedestrian traffic lights 31 prohibit pedestrians 42 from proceeding and the vehicle traffic lights 32 allows vehicles 43 to proceed. Each of steps 2, 3, 5, and 6 transitions to the subsequent step after the elapse of a predetermined number of seconds. That is, the control unit 12 repeatedly performs a process of switching the pedestrian traffic lights 31 and the vehicle traffic lights 32 between the first state and the second state. Steps 2, 3, 5, and 6 can be considered to be transition states between the first state and the second state.

Process of Traffic Light Control Device

Figure 4:
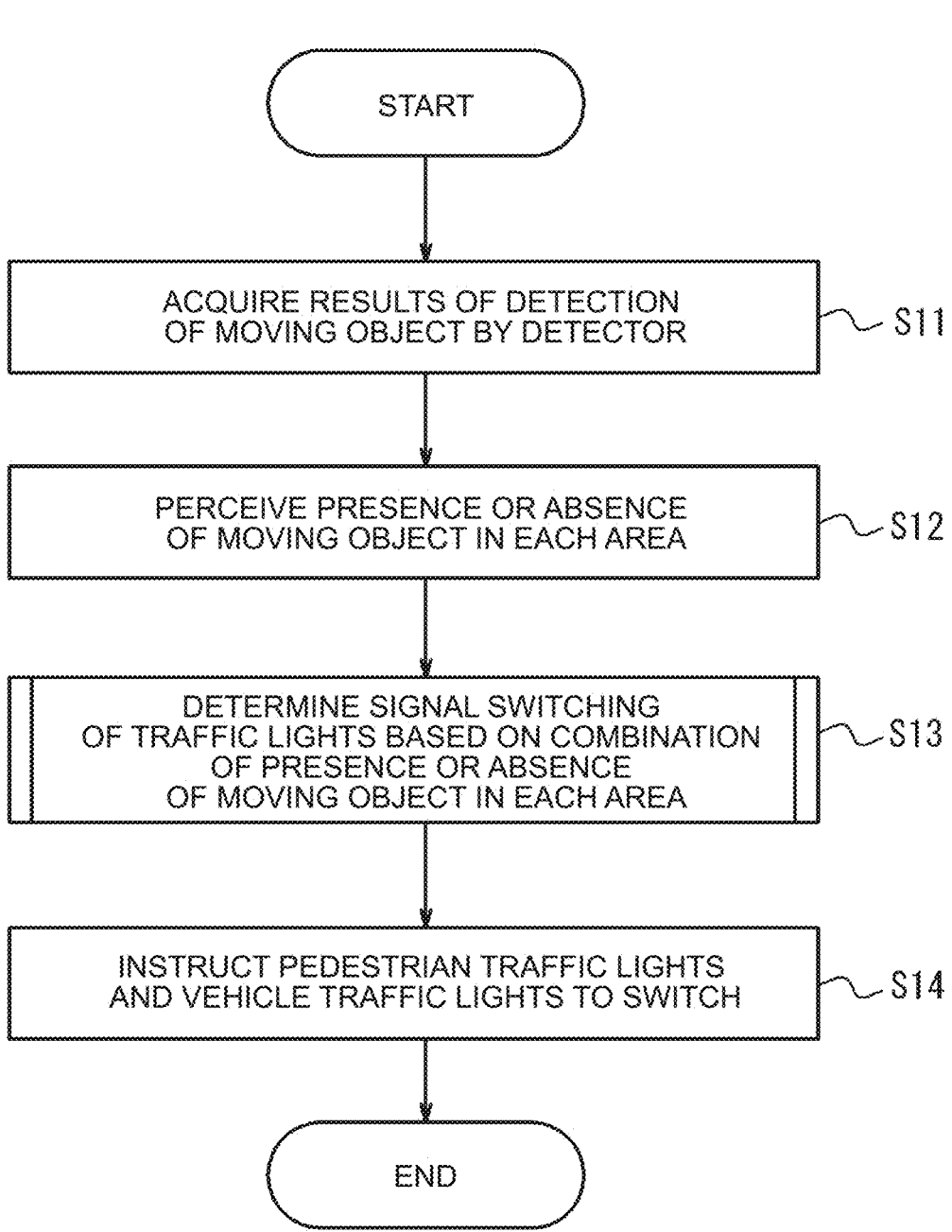
FIG. 4 is a flowchart showing an example of a traffic light control process that is performed by a traffic light control device.

A traffic light control method that is performed by the traffic light control device 10 will be described with reference to the flowchart in FIG. 4. The method disclosed in this specification can be performed by the processor of the control unit 12 according to a program. Such a program can be stored in a non-transitory computer-readable medium. Examples of the non-transitory computer-readable medium include a hard disk, a random access memory (RAM), a read-only memory (ROM), a flash memory, and a compact disc read-only memory (CD-ROM). The non-transitory computer-readable medium is not limited to these.

First, the detector 20 detects a moving object in a detection target area. The control unit 12 of the traffic light control device 10 acquires the detection results of the detector 20 via the communication unit 11 (S11).

Next, the control unit 12 integrates information on the detection results acquired from the detector 20 that is, for example, an edge AI camera, and perceives the presence or absence of a moving object in each detection target area (S12).

Figure 5:
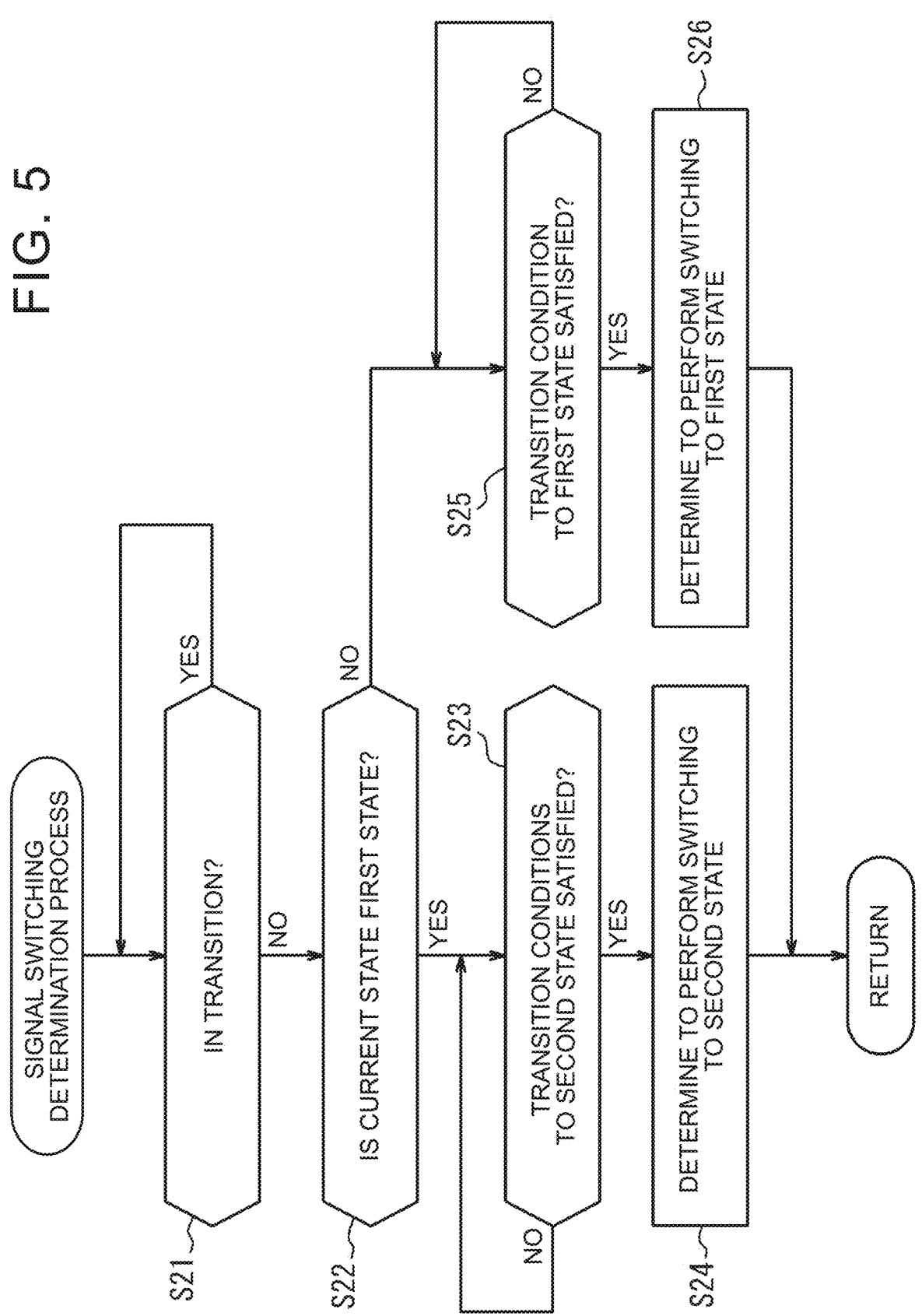
FIG. 5 is a flowchart showing an example of a signal switching determination process in FIG. 4.

The control unit 12 determines to perform signal switching of the pedestrian traffic lights 31 and the vehicle traffic lights 32 based on the combination of the presence or absence of a moving object in each area according to the perception results in S12 (S13). This signal switching determination is determining to control the pedestrian traffic lights 31 and the vehicle traffic lights 32 to transition between the first state and the second state, as shown in FIG. 5. This signal switching determination process in FIG. 5 will be described below.

First, when the pedestrian traffic lights 31 and the vehicle traffic lights 32 are in transition between the first state and the second state (S21: Yes), the control unit 12 waits until the pedestrian traffic lights 31 and the vehicle traffic lights 32 transition to either the first state or the second state (S21: Yes). That is, when the pedestrian traffic lights 31 and the vehicle traffic lights 32 are in the state of step 2 or step 3 in the signal timing chart in FIG. 3, the control unit 12 waits until transition to step 4 is completed. When the pedestrian traffic lights 31 and the vehicle traffic lights 32 are in the state of step 5 or step 6 in the signal timing chart in FIG. 3, the control unit 12 waits until transition to step 1 is completed.

Next, when the current state of the pedestrian traffic lights 31 and the vehicle traffic lights 32 is the first state (step 1) (S22: Yes), the control unit 12 determines whether transition conditions to the second state (step 4) are satisfied (S23). The control unit 12 determines whether the combination of the presence or absence of a moving object in each area acquired from the detector 20 satisfies the transition conditions to the second state shown in FIG. 6.

When the transition conditions to the second state are satisfied in S23 (S23: Yes), the control unit 12 determines to perform switching to the second state (S24). When the transition conditions to the second state are not satisfied in S23 (S23: No), the control unit 12 repeats making a determination in S23 until the transition conditions to the second state are satisfied. As a result, when the transition conditions to the second state are eventually satisfied, the control unit 12 determines to perform switching to the second state (S24).

When the current state of the pedestrian traffic lights 31 and the vehicle traffic lights 32 is the second state (step 4) in S22 (S22: No), the control unit 12 determines whether a transition condition to the first state (step 1) is satisfied (S25). The control unit 12 determines whether the combination of the presence or absence of a moving object in each area acquired from the detector 20 satisfies the transition condition to the first state shown in FIG. 7.

When the transition condition to the first state is satisfied in S25 (S25: Yes), the control unit 12 determines to perform switching to the first state (S26). When the transition condition to the first state is not satisfied in S25 (S25: No), the control unit 12 repeats making a determination in S25 until the transition condition to the first state is satisfied. As a result, when the transition condition to the first state is eventually satisfied, the control unit 12 determines to perform switching to the first state (S26).

Referring back to FIG. 4, the control unit 12 instructs the pedestrian traffic lights 31 and the vehicle traffic lights 32 to switch between the first state and the second state based on the determination result in S13 (S24 and S26) (S14). When switching from the first state to the second state, the control unit 12 controls the pedestrian traffic lights 31 and the vehicle traffic lights 32 to sequentially transition from step 1 to step 4 according to the signal timing chart in FIG. 3. When switching from the second state to the first state, the control unit 12 controls the pedestrian traffic lights 31 and the vehicle traffic lights 32 to sequentially transition from step 4 to step 1 according to the signal timing chart in FIG. 3. As described above, the control unit 12 can sequentially switch the pedestrian traffic lights 31 and the vehicle traffic lights 32 to allow pedestrians 42 and vehicles 43 to proceed across the crosswalk 41 in sequence.

Transition Conditions from First State to Second State

Next, an example of the transition conditions from the first state to the second state will be described with reference to FIG. 6. The numerical values indicating time periods in FIG. 6 are by way of example only. These numerical values can be changed as appropriate.

When condition (1) and any one of conditions (2) to (5) described below are simultaneously satisfied, the control unit 12 starts controlling the pedestrian traffic lights 31 and the vehicle traffic lights 32 to transition to the second state. Condition (1) is that a moving object(s) has been "present" in the third area(s) 53 (vehicle approach area(s)) for one or more seconds. In other words, condition (1) indicates that a vehicle(s) 43 waiting at a stop line etc. to proceed across the crosswalk 41 or a vehicle(s) 43 proceeding toward the crosswalk 41 is present in the third area(s) 53 (vehicle approach area(s)).

Condition (2) is that there is no pedestrian 42 in the first area 51 (crossing area) and the second areas 52 (pedestrian-side vicinity areas). When conditions (1), (2) are simultaneously satisfied, it means that there is no pedestrian 42 crossing or about to cross the crosswalk 41 and there is a vehicle(s) 43 waiting to proceed across the crosswalk 41 or proceeding toward the crosswalk 41. In such a case, the control unit 12 quickly controls the pedestrian traffic lights 31 and the vehicle traffic lights 32 to transition to the step where the vehicle traffic lights 32 turn green.

Condition (3) is that there has been no moving object in the first area 51 (crossing area) for a first period of time or more and there is no moving object in the fourth areas 54 (pedestrian crossing waiting areas). The first period of time in condition (3) is, for example, three seconds. By controlling the pedestrian traffic lights 31 and the vehicle traffic lights 32 to transition to the second state when conditions (1), (3) are simultaneously satisfied, the vehicle(s) 43 can proceed across the crosswalk 41 with reduced unnecessary waiting time after pedestrians 42 finish crossing the crosswalk 41.

Condition (4) is that there has been no moving object in the first area 51 (crossing area) for a second period of time or more and a moving object(s) has been present in the fourth area(s) 54 (pedestrian crossing waiting area(s)) for a third period of time or more. In condition (4), the second period of time is, for example, five seconds, and the third period of time is, for example, 10 seconds. A condition for simultaneously satisfying conditions (1), (4) is a condition that prevents vehicles 43 from remaining prohibited from proceeding across the crosswalk 41 when any pedestrian 42 not waiting to cross the crosswalk 41 is standing still in the fourth area(s) 54 (pedestrian crossing waiting area(s)).

Condition (5) is that there has been no moving object in the first area 51 (crossing area) for the second period of time or more and a moving object(s) has been present in the fifth area(s) 55 (crossing pedestrian approach area(s)) for the third period of time or more. In condition (5), the second period of time is, for example, five seconds, and the third period of time is, for example, 30 seconds. The third period of time varies between when there is a moving object(s) in the fourth area(s) 54 and when there is a moving object(s) in the fifth area(s) 55 and there is no moving object in the fourth areas 54. A condition for simultaneously satisfying conditions (1), (5) is a condition that prevents vehicles 43 from remaining prohibited from proceeding across the crosswalk 41 when any pedestrian 42 not waiting to cross the crosswalk 41 continues to be present in the fifth area(s) 55 (crossing pedestrian approach area(s)).

When condition (6) is also satisfied, the control unit 12 starts controlling the pedestrian traffic lights 31 and the vehicle traffic lights 32 to transition to the second state. Condition (6) indicates that there is a moving object(s) in the third area(s) 53 (vehicle approach area(s)) and the first state has continued for a fourth period of time or more. The fourth period of time in condition (6) is, for example, three minutes. According to this condition, when many pedestrians 42 are crossing the crosswalk 41 and there is no gap in the pedestrian traffic, the control unit 12 starts controlling the pedestrian traffic lights 31 and the vehicle traffic lights 32 to transition to the second state after the elapse of the fourth period of time since detection of a vehicle(s) 43 in the third area(s) 53 (vehicle approach area(s)). The control unit 12 thus ensures passage of vehicles 43 across the crosswalk 41.

Transition Conditions from Second State to First State

FIG. 7 illustrates an example of the transition conditions from the second state to the first state. When condition (7) or (8) is satisfied, the control unit 12 controls the pedestrian traffic lights 31 and the vehicle traffic lights 32 to transition from the second state to the second state. The numerical values indicating time periods in FIG. 7 are by way of example only. These numerical values can be changed as appropriate.

Condition (7) indicates that there has been no moving object in the first area 51 (crossing area) and the third areas 53 (vehicle approach areas) for a fourth period of time or more. The fifth period of time in condition (7) is, for example, one second. This condition allows pedestrians 42 to cross the crosswalk 41 immediately when there is no more vehicle 43 on the crosswalk 41 and the vehicle road 45 leading to the crosswalk 41 after vehicles 43 have passed the crosswalk 41 with the vehicle traffic lights 32 allowing vehicles 43 to proceed.

Condition (8) indicates that transition to the first state is started when the second state has continued for a sixth period of time or more. In condition (8), the sixth period of time is, for example, two minutes. This condition indicates that the pedestrian traffic lights 31 are controlled to green when many vehicles 43 are traveling on the vehicle road 45 and there is no gap in the vehicle traffic and/or when the transition from the second state to the first state based on condition (7) is not started due to an unexpected situation. The unexpected situation is, for example, when there is a vehicle 43 that has been stopped for a long time on a roadside in the third area 53 (vehicle approach area). The transition to the first state based on condition (8) ensures crossing of pedestrians 42 across the crosswalk 41.

As described above, according to the traffic light control system 1 of the present disclosure, the traffic light control device 10 determines to perform signal switching based on the combination of the presence or absence of a moving object in each of the areas, and controls the pedestrian traffic lights 31 and the vehicle traffic lights 32. This method assumes the type and direction of travel of a moving object substantially based on the arrangement, shapes, etc. of the areas where whether there is a moving object is determined. Therefore, this method does not require a process such as identifying the type of moving object and predicting the direction of travel of a moving object. Moreover, since no complex image processing is performed, this method is less susceptible to the weather and/or surrounding brightness. Therefore, the traffic light control system 1 of the present disclosure can operate more stably and at a lower cost than the related art that uses a sophisticated prediction model based on AI image processing.

In particular, since the fourth areas 54 (crossing pedestrian waiting areas) and the fifth areas 55 (crossing pedestrian approach areas) are provided in the traffic light control system 1 of the present disclosure, it is possible to make a determination in consideration of intentions of pedestrians 42 to cross the crosswalk 41. In the traffic light control system 1, the state is switched when any moving object continues to be present in any of the areas for more than a predetermined time. This can prevent or reduce the possibility of occurrence of a deadlock state in which the pedestrian traffic lights 31 and the vehicle traffic lights 32 do not change.

In the traffic light control system 1 of the present disclosure, the pedestrian traffic lights 31 are green in the basic state. Therefore, in the traffic light control system 1 of the present disclosure, pedestrians 42 wanting to cross the crosswalk 41 does not have to unnecessarily wait at a signal. With conventional scheduled switching type traffic lights, pedestrians 42 may be forced to wait at a signal even when there are no vehicle 43 proceeding across the crosswalk 41 on the vehicle road 45, making the pedestrians 42 frustrated due to the unnecessary waiting time. Even with traffic lights with sensors that detect the presence of a pedestrian 42 and change the signal, there may be an unnecessary waiting time for the signal change. The traffic light control system 1 of the present disclosure improves these problems of the related art.

In the traffic light control system 1 of the present disclosure, a moving object(s) that is present in the third area(s) 53 (vehicle approach area(s)), namely the area(s) where vehicles 43 proceed toward the crosswalk 41, is detected. It is therefore possible to detect the presence of not only a vehicle 43 stopped at the stop line in front of the crosswalk 41 but also a vehicle 43 proceeding toward the crosswalk 41. Therefore, when there is no pedestrian 42 crossing or about to cross the crosswalk 41, the vehicle traffic lights 32 are immediately turned green, allowing vehicles 43 to proceed without stopping in front of the crosswalk 41.

In the traffic light control system 1 of the present disclosure, moving objects are detected using the detector(s) 20 installed as road infrastructure, especially a camera(s), it is not necessary to mount a special device on moving objects in order to detect moving objects including pedestrians 42.

The present disclosure is not limited to the above embodiment, and various modifications or alternations can be made. For example, the functions etc. included in each unit, step, etc. can be rearranged so as not to be logically inconsistent, and a plurality of units, steps, etc. may be combined into one, or each unit, step, etc. may be divided into a plurality of units, steps, etc.

What is claimed is:

1. A traffic light control device, comprising one or more memories, and one or more processors in communication with the one or more memories, configured to perform processes including:

acquiring detection results of a moving object in a plurality of detection target areas around a crosswalk including the crosswalk;

perceiving a combination of presence or absence of the moving object in each of the areas based on the acquired detection results;

controlling a pedestrian traffic light and a vehicle traffic light based on the combination; and determining an approach of the moving object to the crosswalk and a waiting state of the moving object based on a combination of arrangement and shapes of the detection target areas and the presence or absence of the moving object in each detection target area.

2. The traffic light control device according to claim 1, wherein the processes further include, in a basic state, controlling the pedestrian traffic light to give an indication that pedestrians are allowed to proceed, when there is no moving object in any of the areas.

3. The traffic light control device according to claim 1, wherein:

the areas include a first area, a second area, and a third area, the first area being an area on the crosswalk, the second area being an area that is used by a pedestrian located near the crosswalk, and the third area being an area that is used by a vehicle proceeding toward the crosswalk, and the processes further include controlling the pedestrian traffic light and the vehicle traffic light to transition between a first state and a second state based on the combination of the presence or absence of the moving object in the first area, the second area, and the third area, the first state being a state in which the pedestrian traffic light allows pedestrians to proceed and the vehicle traffic light prohibits vehicles from proceeding, and the second state being a state in which the pedestrian traffic light prohibits pedestrians from proceeding and the vehicle traffic light allows vehicles to proceed.

4. The traffic light control device according to claim 3, wherein the processes further include controlling the pedestrian traffic light and the vehicle traffic light to transition to the second state when the pedestrian traffic light and the vehicle traffic light are in the first state, there is no moving object in the first area and the second area, and there is a moving object in the third area.

5. The traffic light control device according to claim 3, wherein the processes further include controlling the pedestrian traffic light and the vehicle traffic light to transition to the second state a first period of time after there is no moving object in the first area any more, when the pedestrian traffic light and the vehicle traffic light are in the first state, there is no moving object in the second area, and there is a moving object in the third area.

6. The traffic light control device according to claim 3, wherein the processes further include controlling the pedestrian traffic light and the vehicle traffic light to transition to the second state when there has been no moving object in the first area for a second period of time or more and there has been any moving object in the second area for a third period of time or more, when the pedestrian traffic light and the vehicle traffic light are in the first state and there is a moving object in the third area.

7. The traffic light control device according to claim 6, wherein:

the second area includes a fourth area and a fifth area, the fourth area being an area adjacent to the crosswalk, and the fifth area being an area located farther away from the crosswalk than the fourth area is, and the third period of time varies between when there is a moving object in the fourth area and when there is a moving object in the fifth area and there is no moving object in the fourth area.

8. The traffic light control device according to claim 3, wherein the processes further include controlling the pedestrian traffic light and the vehicle traffic light to transition to the second state when the pedestrian traffic light and the vehicle traffic light are in the first state and there has been any moving object in the third area for a fourth period of time.

9. The traffic light control device according to claim 3, wherein the processes further include controlling the pedestrian traffic light and the vehicle traffic light to transition to the first state when the pedestrian traffic light and the vehicle traffic light are in the second state and there has been no moving object in the first area and the third area for a fifth period of time.

10. The traffic light control device according to claim 3, wherein the processes further include controlling the pedestrian traffic light and the vehicle traffic light to transition to the first state when the pedestrian traffic light and the vehicle traffic light are in the second state and the second state has continued for a sixth period of time.

11. The traffic light control device according to claim 1, wherein:

the moving object includes a plurality of different types of moving objects including a pedestrian, a bicycle, and a vehicle; and the processes do not distinguish among the types of moving objects.

12. The traffic light control device according to claim 1, wherein the processes further include acquiring the detection results from a camera having a function to identify a moving object from a captured image.

13. A traffic light control method that is performed by one or more processors of a traffic light control device, the traffic light control method comprising:

acquiring detection results of a moving object in a plurality of detection target areas around a crosswalk including the crosswalk;

perceiving a combination of presence or absence of the moving object in each of the areas based on the detection results;

controlling a pedestrian traffic light and a vehicle traffic light based on the combination; and determining an approach of the moving object to the crosswalk and a waiting state of the moving object based on a combination of arrangement and shapes of the detection target areas and the presence or absence of the moving object in each detection target area.

14. The traffic light control method according to claim 13, further comprising, in a basic state, controlling the pedestrian traffic light to give an indication that pedestrians are allowed to proceed, when there is no moving object in any of the areas.

15. The traffic light control method according to claim 13, wherein the areas include a first area, a second area, and a third area, the first area being an area on the crosswalk, the second area being an area in a path for pedestrians and located adjacent to the crosswalk, and the third area being an area that is used by a vehicle proceeding toward the crosswalk, and the traffic light control method further includes controlling the pedestrian traffic light and the vehicle traffic light to transition between a first state and a second state based on the combination of the presence or absence of the moving object in the first area, the second area, and the third area, the first state being a state in which the pedestrian traffic light allows pedestrians to proceed and the vehicle traffic light prohibits vehicles from proceeding, and the second state being a state in which the pedestrian traffic light prohibits pedestrians from proceeding and the vehicle traffic light allows vehicles to proceed.

16. The traffic light control method according to claim 15, further comprising controlling the pedestrian traffic light and the vehicle traffic light to transition to the second state when the pedestrian traffic light and the vehicle traffic light are in the first state, there is no moving object in the first area and the second area, and there is a moving object in the third area.

17. The traffic light control method according to claim 15, further comprising controlling the pedestrian traffic light and the vehicle traffic light to transition to the second state a first period of time after there is no moving object in the first area any more when the pedestrian traffic light and the vehicle traffic light are in the first state, there is no moving object in the second area, and there is a moving object in the third area.

18. The traffic light control method according to claim 15, further comprising controlling the pedestrian traffic light and the vehicle traffic light to transition to the second state when there has been no moving object in the first area for a second period of time or more and there has been any moving object in the second area for a third period of time or more, when the pedestrian traffic light and the vehicle traffic light are in the first state and there is a moving object in the third area.

19. The traffic light control method according to claim 18, wherein:

the second area includes a fourth area and a fifth area, the fourth area being an area adjacent to the crosswalk, and the fifth area being an area located farther away from the crosswalk than the fourth area is; and the third period of time varies between when there is a moving object in the fourth area and when there is a moving object in the fifth area and there is no moving object in the fourth area.

20. A traffic light control system, comprising:

a pedestrian traffic light and a vehicle traffic light that are installed to control traffic at a crosswalk;

a detector configured to detect a moving object in a plurality of detection target areas around the crosswalk including the crosswalk; and a traffic light control device including one or more processors, the one or more processors being configured to perform acquiring detection results of a moving object from the detector, perceiving a combination of presence or absence of the moving object in each of the areas based on the detection results, controlling the pedestrian traffic light and the vehicle traffic light based on the combination, and determining an approach of the moving object to the crosswalk and a waiting state of the moving object based on a combination of arrangement and shapes of the detection target areas and the presence or absence of the moving object in each detection target area.

* * * * *